United States Patent [19]
Maki et al.

[11] Patent Number: 4,958,494
[45] Date of Patent: Sep. 25, 1990

[54] CONTROLLER FOR CONTINUOUSLY VARIABLE SPEED TRANSMISSION

[75] Inventors: Kazuya Maki, Aichi; Kouji Yamaguchi, Saitama, both of Japan

[73] Assignee: Honda Giken Kogyo Kabushiki Kaisha, Tokyo, Japan

[21] Appl. No.: 252,642

[22] Filed: Sep. 30, 1988

[30] Foreign Application Priority Data

Oct. 14, 1987 [JP] Japan ................. 62-259226

[51] Int. Cl.⁵ ............................................. F16H 61/40
[52] U.S. Cl. ................................... 60/468; 60/487
[58] Field of Search ............... 180/307; 60/327, 445, 60/448–449, 459, 468, 469, 487–489, 494

[56] References Cited

U.S. PATENT DOCUMENTS

| | | |
|---|---|---|
| 3,135,087 | 6/1964 | Ebert .................. 60/468 X |
| 3,238,723 | 3/1966 | Young . |
| 3,451,218 | 6/1969 | Grant . |
| 3,704,588 | 12/1972 | Trabbic .............. 60/53 R |
| 3,740,951 | 6/1973 | Mori ................... 60/465 |
| 3,866,422 | 2/1975 | Kersten ............... 60/456 |
| 4,122,732 | 10/1978 | Chana ................. 74/863 |
| 4,170,153 | 10/1979 | Mizuno et al. ....... 74/868 |
| 4,253,347 | 3/1981 | Mizuno et al. ....... 74/862 |
| 4,261,229 | 4/1981 | Mizuno et al. ....... 74/866 |
| 4,317,331 | 3/1982 | Aruga et al. ......... 60/468 X |
| 4,484,655 | 11/1984 | Sheppard ............. 60/431 X |
| 4,745,748 | 5/1988 | Hayashi et al. ...... 60/489 |
| 4,776,165 | 10/1988 | Iino .................... 60/468 X |
| 4,782,934 | 11/1988 | Takano et al. ....... 74/866 |

FOREIGN PATENT DOCUMENTS

| | | |
|---|---|---|
| 0127085 | 12/1984 | European Pat. Off. . |
| 0240178 | 10/1987 | European Pat. Off. . |
| 880797 | 5/1953 | Fed. Rep. of Germany . |
| 2363762 | 6/1975 | Fed. Rep. of Germany . |
| 3323694 | 1/1985 | Fed. Rep. of Germany . |
| 52659 | 8/1981 | Japan . |
| 95722 | 8/1981 | Japan . |
| 207229 | 9/1986 | Japan . |
| 29420 | 2/1987 | Japan . |
| 127562 | 6/1987 | Japan . |
| 204052 | 9/1987 | Japan . |
| 473997 | 7/1969 | Switzerland . |
| 1207829 | 1/1986 | U.S.S.R. . |
| 2158542 | 11/1985 | United Kingdom . |

*Primary Examiner*—Carl D. Price
*Assistant Examiner*—George Kapsalas
*Attorney, Agent, or Firm*—Lyon & Lyon

[57] ABSTRACT

A continuously variable speed transmission in which a bypass line is formed between two hydraulic lines disposed between a hydraulic pump and a hydraulic motor to constitute a hydraulic closed circuit, and a opening control valve is disposed to open or close the bypass line. The opening control valve is opened when the reduction rate of the engine speed or the vehicle speed exceeds a given in order to short-cut the two lines and create a neutral condition.

24 Claims, 5 Drawing Sheets

CONTROLLER FOR CONTINUOUSLY VARIABLE SPEED TRANSMISSION

BACKGROUND OF THE INVENTION

The invention relates to a controller for a continuously variable speed transmission comprising a hydraulic pump and a hydraulic motor.

With a continuously variable speed transmission comprising a closed circuit disposed between a hydraulic pump and a hydraulic motor at least one of which is of variable displacement type, as disclosed in the Japanese Patent laid-open publication No. 95722/1981, a bypass line is provided between the pump and motor to communicate two hydraulic lines constituting the closed circuit, and the continuously variable speed transmission is clutch-controlled by opening and closing the bypass line with an opening control valve (clutch valve).

When a vehicle with such a continuously variable speed transmission mounted thereon is decelerated by releasing the depression of the acceleration pedal, such control has been adopted as to prevent excessive engine brake and to maintain smooth running by opening the clutch valve when the vehicle speed falls below a given value see, e.g., to Japanese Patent laid-open publication No. 127562/1987).

Such control, however, when such aggressive braking is applied that wheel locking occurs, may cause engine stall due to overloading caused by the wheel locking before the vehicle speed comes down to the given value. To avoid this problem, a proposal has been made to open the clutch valve as soon as the service brakes are applied (see Japanese laid-open publication No. 207229/1986). But, in this case, even a light depressing of the brake pedal may release the clutch valve, therefore making engine braking not available.

SUMMARY OF THE INVENTION

In view of the above, it is an object and purpose of the invention to provide a controller for a hydraulic continuously variable speed transmission that can secure clutch control.

And for a vehicle with a hydraulic continuously variable speed transmission mounted, it is another object of the invention to provide a controller that can maintain clutch control without causing engine stall during aggressive braking.

For a vehicle with a hydraulic continuously variable speed transmission, it is still another object of the invention to provide a controller that can secure clutch control without loosing engine brake function.

In order to attain the above objectives, in a controller according to the invention, a valve is provided in a bypass hydraulic line formed between two hydraulic lines disposed between the hydraulic pump and the hydraulic motor to configure a hydraulic closed circuit, and when the reduction rate of engine speed or vehicle speed is so rapid as to exceed a given value, the valve is opened to short-circuit the two hydraulic lines through the bypass line.

BRIEF DESCRIPTION OF THE DRAWINGS

In the accompanying drawings, there are shown illustrative embodiments of the invention from which these and other of its objectives, novel features and advantages will be readily apparent.

In the drawings.

DETAILED DESCRIPTION OF THE PREFERRED EMBODIMENTS

Figure 1:
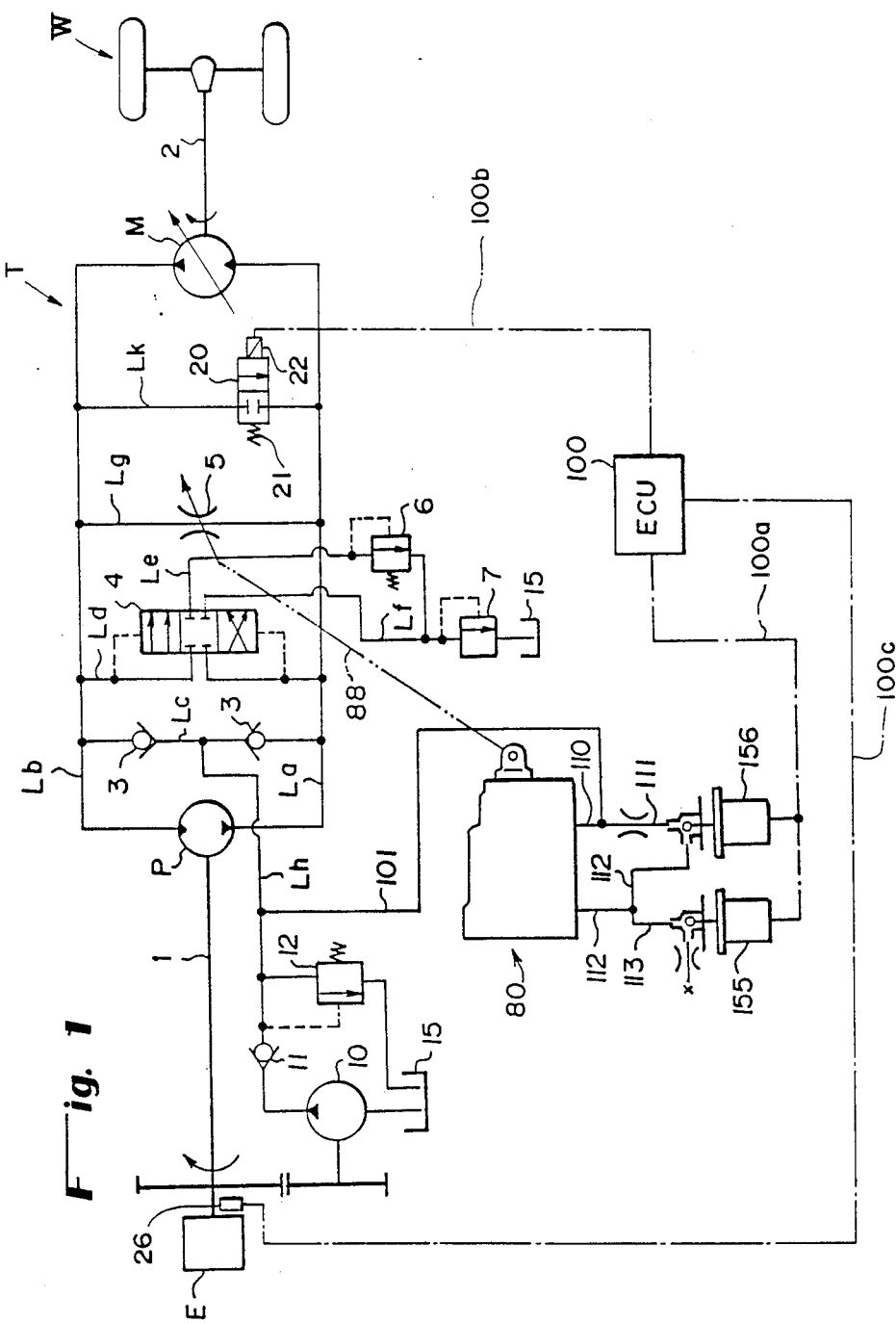
FIG. 1 is a hydraulic circuit diagram of a continuously variable speed transmission provided with a controller, according to the first embodiment of the invention.

FIG. 1 shows a hydraulic circuit diagram of a continuously variable speed transmission provided with a controller, according to the first embodiment of the invention. The continuously variable speed transmission has a constant displacement hydraulic pump P driven by the engine E through the input shaft 1 and a variable displacement hydraulic motor M connected to the output shaft 2 driving the wheels W. The hydraulic pump P and motor M constitute a closed hydraulic circuit along with two hydraulic lines: the first hydraulic line La by which the delivery port of the pump P communicates with the suction port of the motor M, and the second hydraulic line Lb by which the suction port of the pump P does with the delivery port of the motor M.

A charge pump 10 driven by the engine E is connected to the closed circuit through a charge hydraulic line Lh having a check valve 11 and through a third hydraulic line Lc having a pair of check valves 3 and 3. Hydraulic oil pumped up by the charge pump 10 from an oil sump 15 and regulated in its pressure by a charge pressure relief valve 12 is supplied to either of the two hydraulic lines La or Lb which has lower pressure through the check valves 3, 3. A fourth hydraulic line Ld having a shuttle valve 4 is connected to the closed circuit. To the shuttle valve 4 is connected a fifth hydraulic line LE and a sixth hydraulic line LF which respectively have a high pressure relief valve 6 and a low pressure relief valve 7 and are connected to the oil sump 15. The shuttle valve 4 is a 2-port 3-position selector valve, which is operated in response to a hydraulic pressure difference of the first and second hydraulic lines to connect either of the first or second hydraulic lines La, Lb having higher pressure to the fifth hydraulic line Le as well as to connect the other having lower pressure to the sixth hydraulic line Lf. Therefore, the relief pressure of a higher pressure line is regulated by the high pressure relief valve 6, and the relief hydraulic pressure of the other lower pressure-side line is regulated by the low pressure relief valve 7.

Between the first and second hydraulic lines La and Lb is provided a seventh hydraulic line Lg to short-cut the both lines. The seventh hydraulic line Lg is provided with a clutch valve 5, a variable opening control valve to control the opening degree of the line. Therefore, the opening control of the clutch valve 5 can effect clutch control to control the transmission of driving force from the hydraulic pump P to the hydraulic motor M.

Eighth hydraulic line Lk is disposed between the first and second hydraulic lines La and Lb to short-circuit the closed hydraulic circuit by interconnecting the first and second hydraulic lines La and Lb or, in other words, to short-cut the lines La and Lb. The eighth hydraulic line Lk is provided with a two-way solenoid valve 20 to open and close the eighth line Lk. The two-way valve 20 is pushed by a spring 21 to the right on the drawing and is provided with a solenoid 22 at the right end to push the valve to the left, when the solenoid 22 is energized. The solenoid 22 is controlled and energized by a drive signal from a control device 100 through an electric wire 100b. When the solenoid 22 is energized, the two-way valve 20 is pushed to the left and opened by the force generated by the solenoid 22, and when the solenoid 22 is de-energized, the force of the spring 21 moves the two-way valve 20 back to close the two-way valve 20. In other words, when the solenoid 22 is energized, the first and second hydraulic lines La and Lb are short-cut through the eighth line Lk, while when the solenoid 22 is de-energized, the short-cut is interrupted.

The engine E drives the hydraulic pump P and the hydraulic pressure generated by the pump P drives the hydraulic motor M. The drive power of the motor M is transmitted to the wheels W through the output shaft 2 to drive the wheels W. The hydraulic motor M can be, for example, a swash plate type axial piston motor which permits the speed reduction ratio of the continuously variable speed transmission T to be steplessly changed by controlling the tilt angle of the swash plate. The control method of the swash plate is not described because it is well-known.

The operation of the clutch valve 5 is controlled by a clutch servo unit 80, which is controlled by a pair of solenoid valves 155 and 156. The solenoid valves 155, 156 are duty-ratio-controlled by signals from the controller 100. To the controller 100 are inputted an engine speed signal Ne sent from an engine speed sensor 26 through a wire 100c, a throttle position signal $\theta$th, a swash plate tilt angle signal $\theta$tr of the hydraulic motor M, an opening degree $\theta$acc of the acceleration pedal depressed by the operator, a vehicle speed signal V, etc. These signals are combined to issue a signal controlling the solenoid valves to obtain a desirable vehicle running. A "zero" opening degree $\theta$acc means that the acceleration pedal is fully released.

Figure 2:
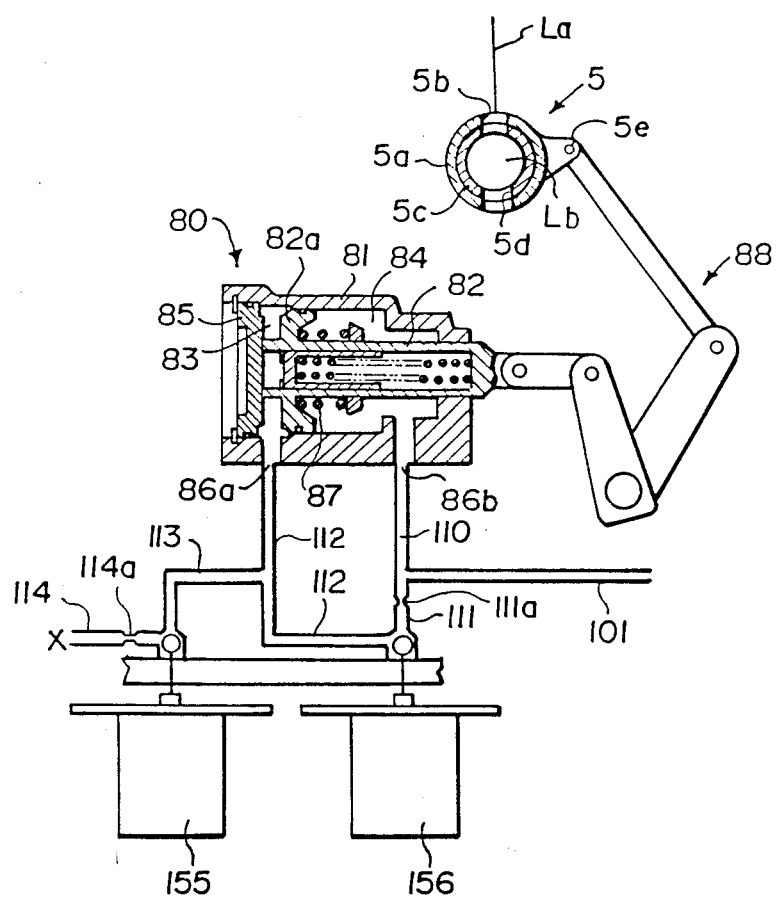
FIG. 2 is a sectional view showing a clutch servo unit which assumes clutch valve position control of the continuously variable speed transmission.

The following is a detailed description of the construction of the clutch servo unit 80, and the operation and control of the clutch servo unit 80 and the two-way valve 20. Refferring to FIGS. 1 and 2:

The clutch servo unit 80 consists of a cylinder member 81, a piston member 82 inserted in the cylinder member 81 slidably to the right and left in FIG. 2, a cover member 85 fixed to cover the cylinder chamber into which the piston member 82 is inserted, and a spring 87 pushing the piston member 82 to the left in FIG. 2. A piston 82a on the piston member 82 divides the cylinder chamber 81 into a left cylinder chamber 83 and a right cylinder chamber 84 to which hydraulic lines 112 and 110 are respectively connected via respective ports 86a and 86b.

The hydraulic oil in the hydraulic line 110 is transferred from the charge pump 10 (whose delivery pressure is regulated by the charge pressure relief valve 12) through a hydraulic line 101, while the hydraulic oil in the hydraulic line 112 is transferred from the hydraulic line 101 through a hydraulic line 111. When the hydraulic oil is diverged from the line 101 into the line 111 and passes through an orifice 111a in the line 111, hydraulic oil pressure is controlled by the two duty-ratio-controlled solenoid valves 155 and 156. Here, the solenoid valve 156 is provided to control the flow rate of the hydraulic oil flowing from the line 111 (having the orifice 111a therein) to the line 112 based on duty ratio signals. The solenoid valve 155 is disposed between a hydraulic line 113 diverging from the line 112 and a hydraulic line 114 communicating with the drain through an orifice 114a, to control the flow of the hydraulic oil from the line 113 to the drain based on duty ratio signals.

Therefore, to the right cylinder chamber 84 via the line 110 is applied the charge pressure regulated by the charge pressure relief valve 12, while to the left cylinder chamber 83 is applied a pressure from the line 112 lower than the charge pressure, by the action of the two solenoid valves 155 and 156. In this manner the force applied on the piston member 82 from the right side (that is, a force due to the hydraulic pressure P1 in the right cylinder chamber 84 plus the force of the spring 87) balances with the force applied on the piston member 82 from the left side (that is, a force due to the hydraulic pressure P2 in the left cylinder chamber 83), when P2 is at a certain level Pb lower than P1, because the area of the right cylinder chamber 84 subject to oil pressure is smaller than that of the left cylinder chamber 83. Therefore, if the solenoid valves 155 and 156 control the hydraulic pressure P2 (in the left cylinder chamber 83) supplied from the line 112 so as to be higher than the pressure Pb, then the piston member 82 will be moved to the right, while when the solenoid valves 155 and 156 control the hydraulic pressure P2 in the left cylinder chamber 83 supplied from the line 112 so as to be lower than the pressure Pb, then the piston member 82 will be moved to the left.

The movement of the piston member 82 to the left or right is transmitted to the clutch valve 5 through a link 88. The clutch valve 5 consists of a stationary member 5a having a first valve port 5b therein, and a rotary member 5c having a second valve port 5d rotatably inserted in the stationary member 5a. An arm 5e engaging with the rotary member 5c is connected to the link 88, thus allowing a rotation of the rotary member 5c in accordance with the movement of the piston member 82. When the rotary member 5c is rotated, the communication between the first and second valve ports 5b and 5d varies from "fully open" to "fully closed". When the piston member 82 is moved to the leftmost as shown in FIG. 2, the communication in the clutch valve 5 is "fully open", while as the piston member 82 moves to the right, the communication varies gradually to "fully closed"

Because the first valve port 5b communicates with the first line La and the second valve port 5d communicates with the second line Lb constituting the hydraulic closed-circuit, the degree of communication between the first and second valve ports 5b and 5d can change the opening degree of the seventh line Lg (or the short-circuit line of the first and second lines La and Lb), thus effecting clutch control. In other words, based on the signals from the controller 100, duty-ratio control of the solenoid valves 155 and 156 can perform a successful clutch control.

This clutch control is intended to adjust the opening of the clutch valve during the starting and stopping of the vehicle. The reference degree of clutch valve opening is predetermined according to the throttle opening (which corresponds to the depression of the accelerator pedal depressed or released by a driver when the driver intends to accelerate or decelerate) and the vehicle speed, and is controlled by the controller 100 which outputs duty-ratio signals to the solenoid valves 155 and 156 so that the opening of the clutch valve 5 coincides with the reference clutch opening determined corresponding to the throttle opening and the vehicle speed detected at any particular moment. But, in a deceleration with the acceleration pedal released (i.e., with zero throttle opening), when a vehicle speed drops down to a given value, the clutch valve 5 is opened to prevent the engine from being stalled before the vehicle comes to a complete stop.

Figure 3:
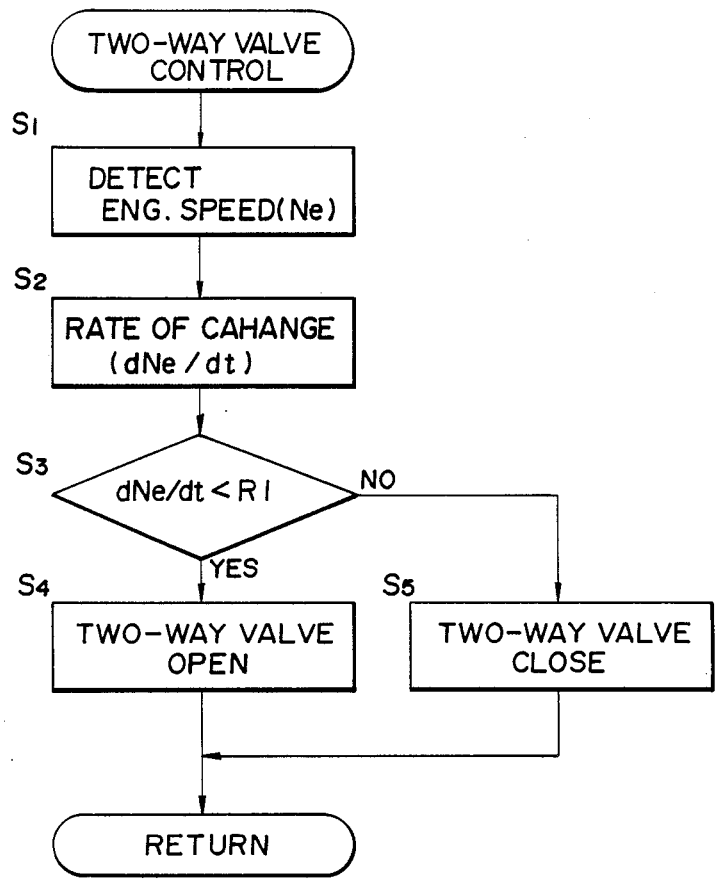
FIG. 3 is a flow chart which shows control of a two-way valve.

The operation of the two-way valve 20 disposed in the eighth line Lk is also controlled by the controller 100. A flow chart of the control is shown in FIG. 3. First, the engine speed signal Ne sent from the engine speed sensor 26 through the line 100c is detected (Step 1). Then the engine speed signal Ne is differentiated by time to calculate its time rate of change (Step 2). When the time rate of change of engine speed (dNe/dt) is negative and smaller than a given value R1 (which is also negative), that is, when the reduction of the engine speed exceeds a given value (i.e., when the engine speed drops too rapidly), the controller 100 outputs drive signals to the two-way valve 20 which excites the solenoid 22, thus allowing the two-way valve to be opened to short-cut the first and second lines La and Lb through the eighth line Lk (Step 4). Otherwise, if the time rate of change of engine speed (dN/dt) is not negative and smaller than the given value R1, then the two-way valve 20 is kept closed (Step 5).

As described above, the control of the clutch valve 5 along with the two-way valve 20 can accomplish such successful operation as: when the wheels are suddenly locked by rapid braking, the opening of the two-way valve 20 prevents engine stall due to overloading the engine E; and while in slow deceleration, engine braking occurs until the vehicle speed drops to a given value, and then the clutch valve 5 is opened when the speed changes to the given value, thus bringing the vehicle to a smooth stop.

The operational control of the two-way valve 20 may be made using vehicle speed signal V rather than engine speed signal Ne. In other words, a vehicle speed signal may be differentiated by time to calculate its rate of change, and when the rate of reduction exceeds a given value, the two-way valve 20 may be opened.

Figure 4:
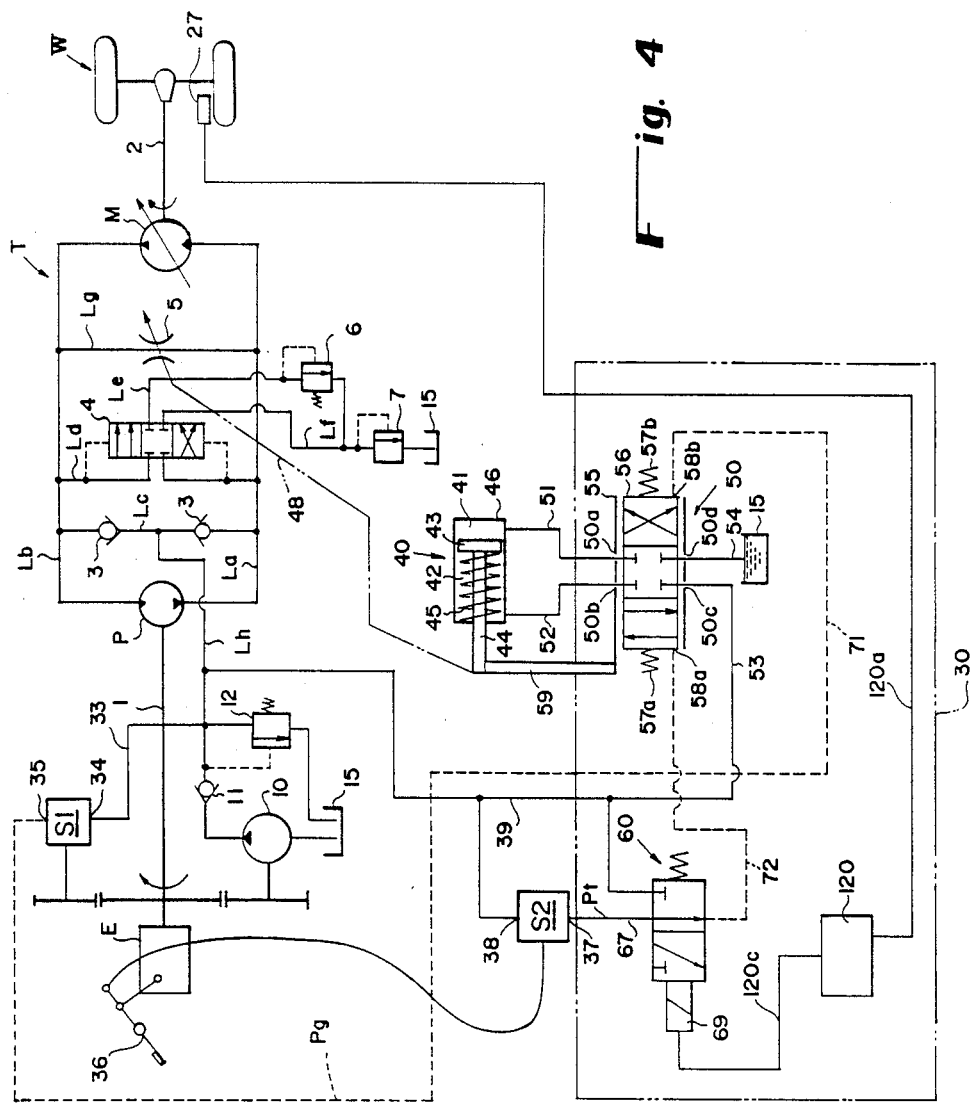
FIG. 4 is a hydraulic circuit diagram of a continuously variable speed transmission provided with a controller, according to a second embodiment of the invention.

FIG. 4 shows a hydraulic circuit diagram of a continuously variable speed transmission provided with a controller, according to a second embodiment of the invention. In the description that follows, features and structure corresponding to those illustrated in FIGS. 1 and 2 are given the same numerals as those given in the FIGS. 1 and 2.

The second embodiment of the hydraulic continuously variable speed transmission T through which the output of engine E is transmitted to the wheels W has the same configuration as the continuously variable speed transmission T shown in FIG. 1, except that the closed circuit has neither eighth line Lk nor the two-way valve 20 provided in the first embodiment. Thus, features and structure previously discussed with regard to the first embodiment will not be further discussed below.

The clutch valve 5 disposed in the hydraulic closed circuit of the transmission T is driven by an actuator 40. The operation of the actuator 40 is controlled by a controller 30 based on a combination of input signals sent from a first detector S1 detecting engine speed to produce hydraulic pressure Pg corresponding to the speed, a second detector S2 detecting throttle opening to produce hydraulic pressure Pt corresponding to the opening, and a vehicle speed sensor 27 detecting vehicle speed to produce an electric signal corresponding to the vehicle speed.

The actuator 40 is connected to the clutch valve 5 by a link 48 with a construction similar to that of the link 88 shown in FIG. 2. The actuator 40 rotates the rotary member 5c in the clutch valve 5 to open and close the clutch valve 5.

The first detector S1 is a hydraulic governor operated in response to the revolution of the input shaft 1. An entry port 34 thereof is connected to a hydraulic line 33 transmitting the delivery oil pressure P1 of the charge pump 10. An exit port 35 of the first detector S1 outputs governor oil pressure Pg proportional to the speed of the engine E. The governor oil pressure Pg is set to be lower than the delivery oil pressure P1 of the charge pump 10 (Pg<P1).

The second detector S2 is a throttle opening-hydraulic pressure transducer which exerts throttle oil pressure Pt corresponding to a movement of a throttle pedal 36 to the exit port 37. An entry port 38 of the second detector S2 is connected to the delivery side of the charge pump 10 through a hydraulic line 39, and throttle oil pressure Pt is set to a pressure lower than the delivery pressure P1 (Pt<P1).

The actuator 40 can be a servo cylinder comprising a cylinder 46, a piston 43 inserted in the cylinder 46 to divide the cylinder 46 into a head chamber 41 and a rod chamber 42, a piston rod 44 formed integrally with the piston 43 to penetrate oil-tightly and slidably the end wall of the rod chamber 42 side of the cylinder 46, and a spring 45 housed in the rod chamber 42 to push the piston 43 toward the head chamber 41 side of the cylinder 46.

The projecting end of the piston rod 44 is connected to the rotary member 5c in the clutch valve 5 through the link 48, and when the piston 43 moves to the left against the force of the spring 45, the clutch valve 5 is moved to the closing direction, while when the piston 43 moves to the right, the clutch valve 5 is moved to the opening direction.

The controller 30 consists of a pilot valve 50, a selector valve 60 and a controller 120. The pilot valve 50 is a four port selector valve to which are connected hydraulic lines 51 and 52, which communicate respectively with the head chamber 41 and the rod chamber 42 in the actuator 40, a hydraulic supply line 53 communicates with the delivery port of the charge pump 10 and a hydraulic relief line 54 communicates with the oil sump 15. The pilot valve 50 is provided with a sleeve 55 and a spool 56 relatively movable to the right and left in the sleeve 55. The sleeve 55 is provided with ports 50a and 50b communicating respectively with the lines 51 and 52, and with ports 50c and 50d communicating respectively with the supply line 53 and the relief line 54. To the sleeve 55 is connected the piston rod 44 in the actuator 40 via a link 59, thus feeding back the operation of the actuator to the pilot valve 50.

The spool 56 can move relatively to the sleeve 55 between three selection positions; a left position connecting the ports 50b and 50c to each other and the ports 50a and 50d to each other, a neutral position blocking the ports 50a and 50b as well as the ports 50c and 50d, and a right position connecting the ports 50a and 50c to each other and the ports 50b and 50d to each other. To push the spool 56 toward the right direction, a spring 57a is butted against the left end of the spool 56, while to push the spool 56 toward the left direction, a spring 57b is butted against the right end of the spool 56. To the pilot valve 50 a selector port 58a is provided to apply hydraulic pressure to the left end of the spool 56, and a selector port 58b is provided to apply hydraulic pressure to the right end of the spool 56.

In such a pilot valve 50, a force F1 acting on the left end of the spool 56 is the summation of a force F11 of the spring 57a and a force F12 due to hydraulic pressure acting on the left end of the spool 56 (F1=F11+F12), and a force F2 acting on the right end of the spool 56 is the summation of a force F21 of the spring 57b and a force F22 due to hydraulic pressure acting on the right end of the spool 56 (F2=F21+F22). The imbalance of these forces F1 and F2 moves the spool 56. For example, when F1 <F2, the spool 56 moves to the left to take the right position, thus introducing the delivery pressure P1 of the charge pump 10 into the head chamber 41 in the actuator 40, and connecting the rod chamber 42 to the oil sump 15. Therefore, the piston 43 and the piston rod 44 move to the left, thus causing the clutch valve 5 to be closed.

Movement of the spool 56 to the left increases the force F11 of the spring 57a, and decreases the force F21 of the spring 57b, thus causing F1 to be equal to F2. Then the balance of the forces brings the spool 56 to a stop. Further, the sleeve 55 is moved to the left by the movement of the piston rod 44 to the left via the link 59. As a result, the relative position of the sleeve 55 and the spool 56 comes to neutral, which stops the flow of hydraulic oil between the ports 50a, 50b, 50c and 50d, thus causing the movement of the piston rod 44 to the left to be stopped. Further, the sleeve 55 comes to a stop in concert with the stopping of the piston rod 44.

When F1>F2, the spool 56 moves to the right, causing the spool 56 to take the left position relative to the sleeve 55. As a result, the delivery oil pressure P1 of the charge pump 10 is introduced into the rod chamber 42 in the actuator 40, causing the head chamber 41 to communicate with the oil sump 15. Therefore, the piston 43 and the piston rod 44 move to the right, thus causing the clutch valve 5 to be opened.

Following the movement of the spool 56 to the right, the force F21 of the spring 57b increases while the force F11 of the spring 57a decreases, thus causing F1 to be equal to F2. The balance of the forces brings the movement to the right of the spool 56 to a stop. At that time, the sleeve 55 also moves to the right corresponding to the movement of the piston rod 44 to the right, thus causing the position of the sleeve 55 relative to the spool 56 to be neutral, which in turn stops the supply of hydraulic pressure to the rod chamber 42, stops the movement of the piston rod 43, and eventually stops the changing of the degree of opening of the clutch valve 5. Further, the movement of the sleeve 55 to the right comes to a stop corresponding to the stopping of the piston rod 44.

With the action of the servo mechanism as described a movement of the piston 43 corresponding to the movement of the spool 56 can adjust the opening and the closing of the clutch valve 5, and therefore the opening and closing of the bypass line Lg.

The selector valve 60 is a 3-port 2-position selector solenoid valve, installed between three hydraulic lines; the line 39 communicates with the delivery port of the charge pump 10, a line 67 communicates with an exit port 37 of the second detector S2, and a pilot line 72 communicates with the selector port 58a of the pilot valve 50. The selector valve 60 is switched from a left position at which the hydraulic line 39 communicates with the pilot line 72 to a right position at which the hydraulic line 67 communicates with the pilot line 72. When a solenoid 69 is de-energized, the selector valve 60 is brought to the right position, and when energized, the selector valve 60 is brought to the left position.

The selector port 58b of the pilot valve 50 communicates with the exit port 35 of the first detector S1 via a pilot hydraulic line 71, thus allowing the governor hydraulic pressure Pg to be applied to the right end of the spool 56.

When the selector valve 60 is in the right position, the following two forces act on the spool 56 in the pilot valve 50; a force F2 acting to the left, the summation of the force F21 of the spring 57b and the force F22 due to the governor hydraulic pressure Pg, and an opposing force F1 acting to the right, the summation of the force F11 of the spring 57a and the force F12 due to the throttle hydraulic pressure Pt. The spool 56 moves so that these forces F1 and F2 keep their balance. On the other hand, when the selector valve 60 is in the left position, the delivery hydraulic pressure P1 is applied on the left end of the spool 56, thus causing the spool 56 to move to the right. Here, the hydraulic pressures P1 and Pg as well as the set loads of the springs 57a and 57b are predefined so as to keep F1 to be larger than F2 until the spool 56 arrives at the furthest right position, thus causing the clutch valve 5 to be fully opened.

Figure 5:
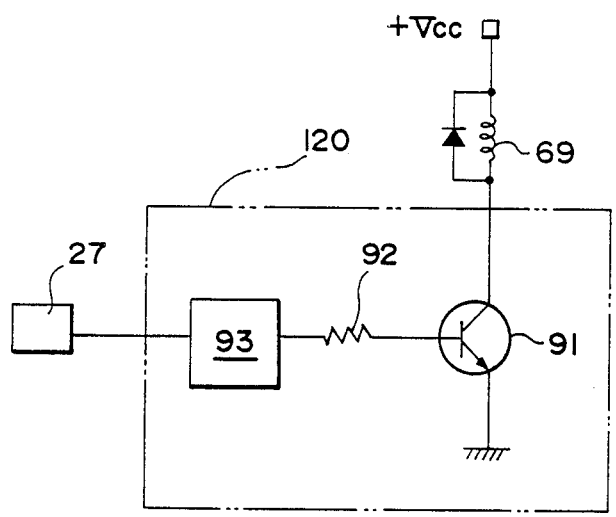
FIG. 5 is an electric circuit diagram of a controller, according to the second embodiment.

The electric control circuit of the controller 120 to control the solenoid 69 in the selector valve 60, as shown in FIG. 5, consists of an NPN type transistor 91 connected in series to the solenoid 69 and a speed reduction decision circuit 93 connected to the base of the transistor 91 via a resistance 92. The speed reduction decision circuit 93 is connected to the vehicle speed sensor 27, and the circuit 93 differentiates the vehicle speed signal from the vehicle speed sensor 27 by time to calculate the speed reduction rate dV/dt and compares the rate dV/dt with a predetermined value. If the speed reduction rate dV/dt is smaller than the given value, that is, if the speed reduction is slower (including the case of no reduction), an OFF signal is issued to the base of the transistor 91. If the speed reduction rate dV/dt is greater than the given value, that is, if speed reduction is rapid, an ON signal is issued to the base of the transistor 91. As a result, when the speed reduction rate dV/dt is smaller than the given value, the transistor 91 is switched off to keep the solenoid 69 de-energized, while when the speed reduction rate dV/dt is greater than the given value, the transistor 91 is switched on to cause the solenoid 69 to be energized.

Next, the operation of the second embodiment according to the invention will be described:

Before the engine E is started, the charge pump 10 does not turn, so the delivery pressure is zero. Therefore, the governor pressure Pg and the throttle pressure Pt also are zero. The vehicle speed V detected by the speed sensor 27 also is zero, thus causing the solenoid 69 to be kept de-energized and the selector valve 60 to be brought to the right position as shown in FIG. 3, resulting in the selector port 58a of the pilot valve 50 to be connected to the exit port 37 of the second detector S2. No hydraulic pressure is applied to either end of the spool 56, thus the position of the spool 56 is determined only by the set loads of the springs 57a and 57b, which are so designed that the spool 56 moves to the right to take the left position. At the same time, in the actuator 40, the piston 43 and the piston rod 44 are moved to the right by the spring 45 to open the clutch valve 5, and the sleeve 55 of the pilot valve 50 is moved to the right by the link 59. In summary, before the engine is started, the clutch valve (and thus the bypass line Lg) is fully opened.

When the engine E is started and enters into an "idling" condition, the charge pump 10 starts rotation to deliver constant hydraulic pressure P1, and the first detector S1 delivers governor hydraulic pressure Pg which is smaller than the delivery pressure P1 of the charge pump 10. The second detector S2 delivers a throttle hydraulic pressure Pt corresponding to the fully closed state of the engine throttle. Further, because the vehicle speed is zero, deceleration is of course smaller than the predetermined value, thus keeping the solenoid 69 in the selector valve 60 de-energized, and the selector valve 60 in the right position. As a result, on the right end of the spool 56 in the pilot valve 50 is applied the governor pressure Pg, while on the left end of the spool 56 in the pilot valve 50 is applied the throttle pressure Pt.

Here, since the force F1 on the spool 56 to the right is predesigned to be slightly smaller than the force F2 to the left, the spool 56 is slightly moved to the left until F1 is equal to F2. As a result, the port 50a is brought into communication with the port 50c, thus causing the delivery pressure P1 of the charge pump 10 to be applied to the head chamber 41 in the actuator 40. Further, the port 50b is brought into communication with the port 50d, thus causing the rod chamber 42 to communicate with the oil sump 15. Therefore, the piston 43 and the piston rod 44 are moved to the left against the force of the spring 45. However, the amount of the movement to the left is so limited that the sleeve 55 connected to the piston rod 44 through the link 59 comes to the neutral position relative to the spool 56.

Therefore, the clutch valve 5 is opened halfway to a (partially engaged clutch condition) and can apply an appropriate initial load to the engine E, thus preventing the revolution number of the engine E (or engine speed) from increasing too far.

When the acceleration pedal is depressed further during engine idling, the throttle valve is opened to increase the throttle pressure Pt, which in turn increases F12 in the pilot valve 50, resulting in an increase of the force F1 on the spool 56 to the right. Further, as the speed of engine E increases, the output pressure of the first detector S1, or the governor pressure Pg, also increases, thus resulting in an increase of the force F2 on the spool 56 to the left in the pilot valve 50. When F2 is greater than F1, the spool 56 is moved to the left, thus causing the delivery pressure P1 to be introduced into the head chamber 41, and the rod chamber 42 to communicate with oil sump 15. Therefore, the piston 43 and the piston rod 44 are moved to the left in the actuator 40, which moves the clutch valve 5 gradually toward the closed position thus starting the drive of the hydraulic motor M by the pump P.

In the meantime, the spool 56 is further moved to the left corresponding to the balance of the forces F1 and F2, and eventually comes to a halt at the left most position, when the clutch valve 5 is brought to fully closed position, thus allowing the full capacity of the pump P to drive the hydraulic motor M.

As described above, start control of vehicle is performed and the vehicle enters into normal traveling. Next, control in deceleration is described:

First, when decelerating a vehicle only by releasing the acceleration pedal during normal traveling or by depressing the brake pedal lightly, the reduction rate in vehicle speed may be smaller than the given value. In this case, the solenoid 69 in the selector valve 60 is kept de-energized as described above. At this time, because the acceleration pedal is released, the throttle pressure Pt from the second detector S2 is lowered gradually, but since the inertia of the rotating wheels W drives the engine E, thus allowing the engine E to be kept rotating in correspondence to the vehicle speed, the governor pressure Pg from the first detector S1 is kept to a pressure corresponding to the engine rotation. Therefore, the spool 56 in the pilot valve 50 is pushed to the left, the clutch valve 5 is maintained fully closed by the actuator 40, and the vehicle speed is reduced under engine braking.

In contrast, when service brakes are applied, and the reduction rate of vehicle speed exceeds the given value, the solenoid 69 in the selector valve 60 is energized, thus causing the selector valve 60 to go to the right position. Therefore, the delivery pressure P1 applies through the pilot line 72 on the left end of the spool 56, which is then moved to the right. As a result, the piston 43 and the piston rod 44 in the actuator 40 are moved to the right to open the clutch valve 5. In other words, when the reduction rate of vehicle speed exceeds the given value, as it happens in hard braking, the clutch valve 5 is opened regardless of the vehicle speed, thus preventing engine overload.

In the above-described second embodiment, the energizing or de-energizing of the solenoid 69 in the selector valve 60 is made based on the reduction rate of vehicle speed. However, the aforesaid energizing or de-energizing may be made based on the reduction rate of the engine speed calculated using the signal sent from the engine rotational sensor 26 (shown in FIG. 1) instead of using the signal sent from the vehicle speed sensor 27.

As described above, even if service brakes are applied during traveling, the clutch valve disposed in the bypass line is opened in response to the rapid reduction rate of engine speed or vehicle speed. Therefore, before the wheels are locked by braking, the clutch valve is opened to interrupt the hydraulic power transmission between the engine and the wheels, eliminating overloading of the engine, thus resulting in prevention of engine stall. On the other hand, when the reduction rate of the engine speed or the vehicle speed is not so great, as often occurs in a light application of vehicle brakes, the clutch valve is left closed, thus allowing a desirable engine brake to be maintained.

It will be clear to those skilled in the art that various changes may be made in the invention without departing from the spirit and scope thereof and therefore the invention is not limited by that which is shown in the drawings and described in the specification but only as indicated in the appended claim.

What is claimed is:

1. A controller adapted for a continuously variable speed transmission having a hydraulic pump driven by an engine, a hydraulic motor driven by pressurized fluid sent from said hydraulic pump, and a closed hydraulic circuit with two hydraulic lines disposed between said pump and said motor, at least one of said pump and said motor being of variable displacement type;

said controller comprising:
a bypass line through which one of said two hydraulic lines is communicated with the other; and
an opening control valve disposed in said bypass line to selectively interrupt or permit the flow of hydraulic fluid through said bypass line;
said opening control valve being opened to connect said two hydraulic lines through said bypass line when a reduction rate of engine speed exceeds a given value, even if said engine speed is higher than a predetermined speed at which said two hydraulic lines would otherwise be connected to avoid engine stall.

2. The controller according to claim 1, wherein said opening control valve comprises a clutch valve disposed in said bypass line.

3. The controller according to claim 1, wherein said opening control valve comprises a solenoid two-way valve.

4. A controller adapted for a continuously variable speed transmission having a hydraulic pump driven by an engine, a hydraulic motor driven by pressurized fluid sent from said hydraulic pump, and a closed hydraulic circuit with two hydraulic lines disposed between said pump and said motor, at least one of said pump and said motor being of variable displacement type;

said controller comprising:
a bypass line through which one of said two hydraulic lines is communicated with the other; and
an opening control valve disposed in said bypass line to selectively interrupt or permit the flow of hydraulic fluid through said bypass line;
said opening control valve being opened to connect said two hydraulic lines through said bypass line when a reduction rate of vehicle speed exceeds a given value, even if said vehicle speed is higher than a predetermined speed at which said two hydraulic lines would otherwise be connected to avoid engine stall.

5. The controller according to claim 4, wherein said opening control valve comprises a clutch valve disposed in said bypass line.

6. The controller according to claim 4, wherein said opening control valve comprises a two-way valve.

7. A controller in a continuously variable transmission having a hydraulic pump and a hydraulic motor interconnected by a closed hydraulic circuit, said closed hydraulic circuit having a first hydraulic line connecting an input port of said hydraulic motor with an outlet port of said hydraulic pump and a second hydraulic line connecting an outlet port of said hydraulic motor with an input port of said hydraulic pump, and an engine for driving said hydraulic pump, comprising,
a bypass line communicating with said first hydraulic line and with said second hydraulic line, and
control means for selectively opening said bypass line when a time rate of change of engine speed of said engine is negative and the absolute value of said time rate of change of engine speed exceeds the absolute value of a given value.

8. A controller in a continuously variable transmission having a hydraulic pump and a hydraulic motor interconnected by a closed hydraulic circuit, said closed hydraulic circuit having a first hydraulic line connecting an input port of said hydraulic motor with an outlet port of said hydraulic pump and a second hydraulic line connecting an outlet port of said hydraulic motor with an input port of said hydraulic pump, and an engine for driving said hydraulic pump, comprising,
a bypass line communicating with said first hydraulic line and with said second hydraulic line, and
control means for selectively opening said bypass line when the reduction rate of the engine speed of said engine exceeds a given value.

9. A controller according to claim 8, wherein said control means comprises a bypass valve in said bypass line for selectively opening and closing said bypass line, and means for operating said bypass valve.

10. A controller according to claim 8, wherein said control means comprises a bypass valve in said bypass line, means for selectively opening and closing said bypass valve in response to a drive signal, controller means for providing said drive signal to said means for selectively opening and closing, and engine speed sensor means for providing a speed signal corresponding to the speed of said engine to said controller means.

11. A controller according to claim 10, wherein said controller means comprises differentiation means for differentiating said speed signal with respect to time, and comparison means for comparing the differentiated speed signal with a given value and outputting said drive signal to cause said bypass valve to open if said differentiated speed signal is both negative and smaller than said given value.

12. A controller according to claim 8, wherein said control means comprises a clutch valve in said bypass line for selectively opening and closing said bypass line, and means for operating said clutch valve.

13. A method of controlling a bypass valve in a bypass passage connecting a first hydraulic line and an second hydraulic line in a continuously variable transmission, said first hydraulic line being connected to an input port of a hydraulic motor and an output port of a hydraulic pump and said second hydraulic line being connected to an output port of said hydraulic motor and an input port of said hydraulic pump, said hydraulic pump being connected to an engine, comprising the steps of
detecting a speed of said engine,
determining the time rate of change of said speed of said engine,
comparing said time rate of change of speed with a negative given value, and
selectively closing and opening said bypass valve depending on whether said time rate of change of speed is greater than said given value or not greater than said given value.

14. A method of controlling a bypass valve according to claim 13, wherein said bypass valve is closed if said time rate of change of speed is greater than said given value.

15. A method of controlling a bypass valve according to claim 13, wherein said bypass valve is opened if said time rate of change of speed is not greater than said given value.

16. A controller in a continuously variable transmission in a vehicle, said transmission having a hydraulic pump and a hydraulic motor interconnected by a closed hydraulic circuit, said closed hydraulic circuit having a first hydraulic line connecting an input port of said hydraulic motor with an outlet port of said hydraulic pump and a second hydraulic line connecting an outlet port of said hydraulic motor with an input port of said hydraulic pump, comprising,
- a bypass line communicating with said first hydraulic line and with said second hydraulic line, and
- control means for selectively opening said bypass line when a time rate of change of vehicle speed of said vehicle is negative and the absolute value of said time rate of change of vehicle speed exceeds the absolute value of a given value.

17. A controller in a continuously variable transmission in a vehicle, said transmission having a hydraulic pump and a hydraulic motor interconnected by a closed hydraulic circuit, said closed hydraulic circuit having a first hydraulic line connecting an input port of said hydraulic motor with an outlet port of said hydraulic pump and a second hydraulic line connecting an outlet port of said hydraulic motor with an input port of said hydraulic pump, comprising,
- a bypass line communicating with said first hydraulic line and with said second hydraulic line, and
- control means for selectively opening said bypass line when the reduction rate of the speed of said vehicle exceeds a given value.

18. A controller according to claim 17, wherein said control means comprises a bypass valve in said bypass line for selectively opening and closing said bypass line, and means for operating said bypass valve.

19. A controller according to claim 17, wherein said control means comprises a bypass valve in said bypass line, means for selectively opening and closing said bypass valve in response to a drive signal, controller means for providing said drive signal to said means for selectively opening and closing, and vehicle speed sensor means for providing a speed signal corresponding to the speed of said vehicle to said controller means.

20. A controller according to claim 19, wherein said controller means comprises differentiation means for differentiating said speed signal with respect to time, and comparison means for comparing the differentiated speed signal with a given value and outputting said drive signal to cause said bypass valve to open if said differentiated speed signal is both negative and smaller than said given value.

21. A controller according to claim 17, wherein said control means comprises a clutch valve in said bypass line for selectively opening and closing said bypass line, and means for operating said clutch valve.

22. A method of controlling a bypass valve in a bypass passage connecting a first hydraulic line and an second hydraulic line in a continuously variable transmission, said first hydraulic line being connected to an input port of a hydraulic motor and an output port of a hydraulic pump and said second hydraulic line being connected to an output port of said hydraulic motor and an input port of said hydraulic pump, said transmission being installed in a vehicle, comprising the steps of
- detecting a speed of said vehicle,
- determining the time rate of change of said speed of said vehicle,
- comparing said time rate of change of speed with a negative given value, and
- selectively opening said bypass valve when said time rate of change of speed is not greater than said given value.

23. A method of controlling a bypass valve according to claim 22, wherein said bypass valve is a clutch.

24. A controller in a continuously variable transmission in a vehicle, said transmission having a hydraulic pump and a hydraulic motor interconnected by a closed hydraulic circuit, said closed hydraulic circuit having a first hydraulic line connecting an input port of said hydraulic motor with an outlet port of said hydraulic pump and a second hydraulic line connecting an outlet port of said hydraulic motor with an input port of said hydraulic pump, comprising,
- a bypass line communicating with said first hydraulic line and with said second hydraulic line,
- clutch means in said bypass line for selectively opening and closing said bypass line to connect and disconnect, respectively, said first hydraulic line with said second hydraulic line,
- a vehicle speed sensor for detecting the speed of said vehicle, and
- control means for controlling said clutch means to open said bypass line when the reduction rate of the speed of said vehicle exceeds a given value.

* * * * *